(12) United States Patent
Kim et al.

(10) Patent No.: US 10,811,152 B2
(45) Date of Patent: Oct. 20, 2020

(54) HEAT EXCHANGER AND NUCLEAR POWER PLANT COMPRISING SAME

(71) Applicant: KOREA ATOMIC ENERGY RESEARCH INSTITUTE, Daejeon (KR)

(72) Inventors: Young In Kim, Daejeon (KR); Keung Koo Kim, Daejeon (KR); Ju Hyeon Yoon, Daejeon (KR); Suhn Choi, Daejeon (KR); Hun Sik Han, Seoul (KR); Han Ok Kang, Daejeon (KR)

(73) Assignee: KOREA ATOMIC ENERGY RESEARCH INSTITUTE, Daejeon (KR)

(*) Notice: Subject to any disclaimer, the term of this patent is extended or adjusted under 35 U.S.C. 154(b) by 419 days.

(21) Appl. No.: 15/513,275

(22) PCT Filed: Sep. 10, 2015

(86) PCT No.: PCT/KR2015/009507
§ 371 (c)(1),
(2) Date: Mar. 22, 2017

(87) PCT Pub. No.: WO2016/047939
PCT Pub. Date: Mar. 31, 2016

(65) Prior Publication Data
US 2017/0309354 A1    Oct. 26, 2017

(30) Foreign Application Priority Data
Sep. 22, 2014 (KR) .................. 10-2014-0126076

(51) Int. Cl.
*G21C 17/00* (2006.01)
*G21C 17/032* (2006.01)
(Continued)

(52) U.S. Cl.
CPC ........... *G21C 17/032* (2013.01); *G21C 15/02* (2013.01); *G21C 17/002* (2013.01); *G21D 1/006* (2013.01);
(Continued)

(58) Field of Classification Search
CPC ................................ G21C 15/00; G21C 15/02
(Continued)

(56) References Cited

U.S. PATENT DOCUMENTS

| 4,665,975 A | 5/1987 | Johnston |
| 2011/0088882 A1* | 4/2011 | Persson .................. F28D 9/005 165/167 |

FOREIGN PATENT DOCUMENTS

| JP | 2001-133173 A | 5/2001 |
| JP | 2006-313030 A | 11/2006 |

(Continued)

OTHER PUBLICATIONS

International Search Report dated Dec. 18, 2015 issued in PCT/KR2015/009507.

*Primary Examiner* — Marshall P O'Connor
(74) *Attorney, Agent, or Firm* — Scully, Scott, Murphy & Presser, P.C.

(57) ABSTRACT

The present invention relates to a plate heat exchanger and provides a heat exchanger and a nuclear power plant comprising same, the heat exchanger comprising: a plate unit having multiple plates overlapping one another; a flow path unit, which forms flow paths having fluids flowing therein by processing at least parts of the respective plates; and a detection flow path formed between the multiple plates so as to allow the fluids leaking from the flow paths to flow thereinto and formed so as to detect the leakage of the fluids from the flow paths.

17 Claims, 15 Drawing Sheets

(51) Int. Cl.
*G21C 15/02* (2006.01)
*G21D 1/00* (2006.01)
*G21C 1/32* (2006.01)
*F22B 37/00* (2006.01)

(52) U.S. Cl.
CPC ............... *F22B 37/00* (2013.01); *G21C 1/32* (2013.01); *Y02E 30/40* (2013.01)

(58) Field of Classification Search
USPC .................................................. 165/167, 174
See application file for complete search history.

(56) References Cited

FOREIGN PATENT DOCUMENTS

| KR | 100950198 B1 | 3/2010 |
| KR | 100991113 B1 | 11/2010 |
| KR | 20120075838 A | 7/2012 |

* cited by examiner

HEAT EXCHANGER AND NUCLEAR POWER PLANT COMPRISING SAME

CROSS-REFERENCE TO RELATED APPLICATIONS

This application is the National Stage filing under 35 U.S.C. 371 of International Application No. PCT/KR2015/009507, filed on Sep. 10, 2015, which claims the benefit of earlier filing date and right of priority to Korean Application No. 10-2014-0126076, filed on Sep. 22, 2014, the contents of which are all hereby incorporated by reference herein in their entirety.

TECHNICAL FIELD

The present disclosure relates a plate type heat exchanger and, more particularly, to a heat exchanger using a fine flow path such as a plate type or printed circuit heat exchanger, and a nuclear power plant including the same.

BACKGROUND ART

A printed circuit heat exchanger was developed by Heatric Ltd. of the United Kingdom (patent: U.S. Pat. No. 4,665,975, 1987) and has been variously used in general industrial fields. The printed circuit heat exchanger is a heat exchanger having a structure without welding between plates using a dense flow path disposition and diffusion welding technique based on a photo-chemical etching technique. Thus, the printed circuit heat exchanger is applicable to a high temperature high pressure environment and has highly integrated excellent heat exchange performance. Due to the advantages such as durability regarding a high temperature high pressure environment, excellent heat exchange performance, high integration, and the like, an application range of the printed circuit heat exchanger extends to various fields such as an evaporator, a condenser, a cooler, a radiator, a heat exchanger, a reactor, and the like, in a cooling/heating system, a fuel cell, an automobile, a chemical process, a medical appliance, nuclear power, information communication equipment, an extremely low temperature environment Meanwhile, a technique of manufacturing a printed circuit type uses a photo-chemical etching technique, and thus, a heat exchanger may be freely processed through the technique of manufacturing a printed circuit type, compared with a general processing scheme.

A plate type heat exchanger to be utilized as an example of the present disclosure has been extensively applied in the industrial field over 100 years. Generally, in the plate type heat exchanger, a plate is extruded to form a flow path and plates are coupled using a gasket of using general welding or brazing welding. Accordingly, the plate type heat exchanger is applied to an application field similar to that of the printed circuit heat exchanger, but it is more frequently used in a low pressure environment. Heat exchange performance of the plate type heat exchanger is lower than that of the printed circuit heat exchanger and better than that of a shell and tube type heat exchanger. Also, the plate type heat exchanger is manufactured simply, compared with the printed circuit heat exchanger.

Meanwhile, maintenance including nondestructive inspection regarding a steam generator is performed in major components of a nuclear power plant in accordance with the purposes of safety, reliability, enhance of availability, and the like, and related requirements. However, in the case of a shell & tube heat exchanger or a steam generator using a very small, thin tube, or in the case of a plate type (printed circuit or plate type) heat exchanger or a steam generator, a thin tube or a detailed flow path is so thin that a maintenance work such as a close inspection on a flow path, or the like, is difficult to perform.

DISCLOSURE

Technical Problem

An aspect of the present disclosure is to overcome a difficulty of maintenance due to characteristics of a small flow path of a plate type heat exchanger or a steam generator, particularly, a printed circuit heat exchanger or a steam generator which has excellent pressure resistance and structural soundness (integrity) so as to be used as a multi-purpose heat exchange facility such as a high temperature high pressure facility or a high toxicity chemical facility.

Technical Solution

According to an aspect of the present invention, a heat exchanger includes: a plate unit in which a plurality of plates overlap each other; a flow path unit forming a flow path in which a fluid flows by processing at least a portion of each plate; and a monitoring flow path formed between the plurality of plates such that a fluid leaked from the flow path flows thereto, and detecting a fluid leaked from the flow path.

According to an example related to the present disclosure, the flow path unit may include a first flow path in which a fluid having a relatively high temperature flows; and a second flow path spaced apart from the first flow path and allowing a fluid having a temperature lower than that of the high temperature fluid to heat-exchange with the high temperature fluid.

The monitoring flow path may be formed between the first flow path and the second flow path.

The plate unit may include a first plate in which the first flow path is formed; and a second plate in which the second flow path is formed, and the monitoring flow path may be formed between the first and second plates.

The heat exchanger may further include: a third plate disposed between the first and second plates, wherein the monitoring flow path may be formed in the third plate.

The monitoring flow path may be formed to be in contact with the first plate or the second plate.

The heat exchanger may further include: a fourth plate spaced apart from the third plate and formed to be in contact with the first plate or the second plate, wherein the monitoring flow path may be formed as a plurality of flow paths and include a first monitoring flow path formed in the third plate and a second monitoring flow path formed in the fourth plate.

According to another example related to the present disclosure, the monitoring flow path may be formed as an open flow path including first passages formed in one direction as a plurality of flow paths are spaced apart from each other; and a second passage allowing the first passages to communicate with each other.

Here, the monitoring flow path may be formed as a fine flow path having a size of a cross-section smaller than those of the first flow path and the second flow path in order to restrain a degradation of performance of heat exchange between the first flow path and the second flow path.

According to another example related to the present disclosure, at least one of the first and second flow paths may be formed across at least two plates.

According to another example related to the present disclosure, the monitoring flow path may be formed as a plurality of flow paths and may have a monitoring flow path header to which the plurality of flow paths gather, in order to detect a change in a state of a fluid within the monitoring flow path.

Also, the heat exchanger may further include: a sensor unit connected to the monitoring flow path header and detecting a change in temperature, pressure, humidity, a physical state, a chemical state, or a radioactive level within the monitoring flow path when a fluid flows out from the flow path and is introduced to the monitoring flow path.

Here, the inside of the monitoring flow path may be filled with a compressible or incompressible fluid, and a pressure controller detecting a variation in pressure may be connected to the monitoring flow path header.

Here, the heat exchanger may further include: a monitoring measurement instrument connected to the pressure controller and detecting in a change in an internal state of the pressure controller.

According to another example related to the present disclosure, the second flow path may include a flow resistance part including a bent or curved flow path extending to be longer than a length of a straight line drawn from the inlet to the outlet, in order to increase resistance of a flow path to resolve flow instability due to an introduction of a fluid to an inlet portion through which a fluid is introduced.

According to another example related to the present disclosure, the second flow path may include: a plurality of main flow paths spaced apart from each other; and a sub-flow path formed such that the main flow paths spaced apart from each other communicate with each other.

Here, the flow resistance part may be formed as an economizer in which a bent form is repeated in a progress direction of the flow path in order to make a flow rate of a fluid introduced to the flow path uniform and enhance heat transfer.

According to another aspect of the present invention, a nuclear power plant having a heat exchanger is provided. The nuclear power plant includes a nuclear reactor including a reactor core and formed to allow a coolant to circulate therein; and a heat exchanger disposed within or outside the nuclear reactor and heat-exchanging with the coolant introduced thereto, wherein the heat exchanger includes: a plate unit in which a plurality of plates overlap each other; a flow path unit forming a flow path in which a fluid flows by processing at least a portion of each plate; and a monitoring flow path formed between the plurality of plates such that a fluid leaked from the flow path flows thereto, and detecting a fluid leaked from the flow path.

Here, the heat exchanger may be a steam generator generating steam from feedwater steam upon receiving high temperature high pressure coolant heated by the reactor core.

Advantageous Effects

According to at least one embodiment of the present disclosure having the aforementioned configuration, since a very small flow path, compared with a main flow path, is formed in a monitoring fine flow path, an influence of a reduction in structural strength or heat transfer performance may be negligible.

Also, according to at least one embodiment of the present disclosure, since a defect that occurs during an operation of the heat exchanger (or steam generator) is sensed at an initial stage, requirements for checking and inspection on the heat exchange flow path are alleviated, and thus, maintenance of the heat exchanger may be significantly simplified.

Also, according to at least one embodiment of the present disclosure, since a damage that occurs in any one main flow path during an operation of the heat exchanger (or the steam generator) is sensed at an initial stage, a fluid of one flow path is prevented from being transferred to the other flow path, preventing an accident, whereby safety of the heat exchanger may be significantly enhanced.

Also, according to at least one embodiment of the present disclosure, since a maintenance problem arising when a plate type steam generator or heat exchanger is applied to a steam generator or a heat exchanger of a nuclear power plant is solved, the plate type steam generator or heat exchanger may be easily applied to the nuclear power plant (pressurized water reactor, a high temperature gas-cooled reactor, or a liquid metal reactor, etc.).

Also, according to at least one embodiment of the present disclosure, since the heat exchanger or the steam generator using a plate type can make a large heat transfer area, a size may be significantly reduced, compared with a related art shell & tube type heat exchanger or steam generator.

Also, according to at least one embodiment of the present disclosure, the related art having excellent heat exchange efficiency may be applied to a plate type heat exchanger for heat-exchange between fluids flowing in main flow paths, and even when an improvement (an increase in a flow path area) regarding a partial flow path is applied to reduce flow resistance, a size may be significantly reduced, compared with the related art shell & tube type steam generator. Also, even when the improvements (an increase in flow path area and provision of a flow resistance part and an economizer) are applied to a partial flow path in the plate type steam generator, a size may be significantly reduced compared with the related art shell & tube type steam generator.

Also, in cases where at least one embodiment of the present disclosure is applied to an integrated nuclear reactor, a size of the steam generator may be significantly reduced to reduce a nuclear reactor vessel and a nuclear reactor building and obtain an additional effect of enhancing economic efficiency of a nuclear power plant.

Also, in cases where at least one embodiment of the present disclosure is applied to a steam generator of a high temperature gas-cooled reactor or a liquid metal reactor, an intermediate loop may be removed to significantly simplify a facility.

BEST MODES

Hereinafter, a heat exchanger and a nuclear power plant having the same related to the present disclosure will be described in detail with reference to the accompanying drawings, in which like numbers refer to like elements throughout although the embodiments are different. As used herein, the singular forms "a", "an" and "the" are intended to include the plural forms as well, unless the context clearly indicates otherwise.

In the present disclosure, a plate type heat exchanger comprehensively refers to every heat exchanger or steam generator different in a processing method or a bonding method of a plate, as well as a general plate type and printed circuit heat exchanges or steam generators, unless otherwise mentioned. Also, the present disclosure may also be applicable to a plate type heat exchanger, without being limited to the printed circuit heat exchanger.

Figure 1:
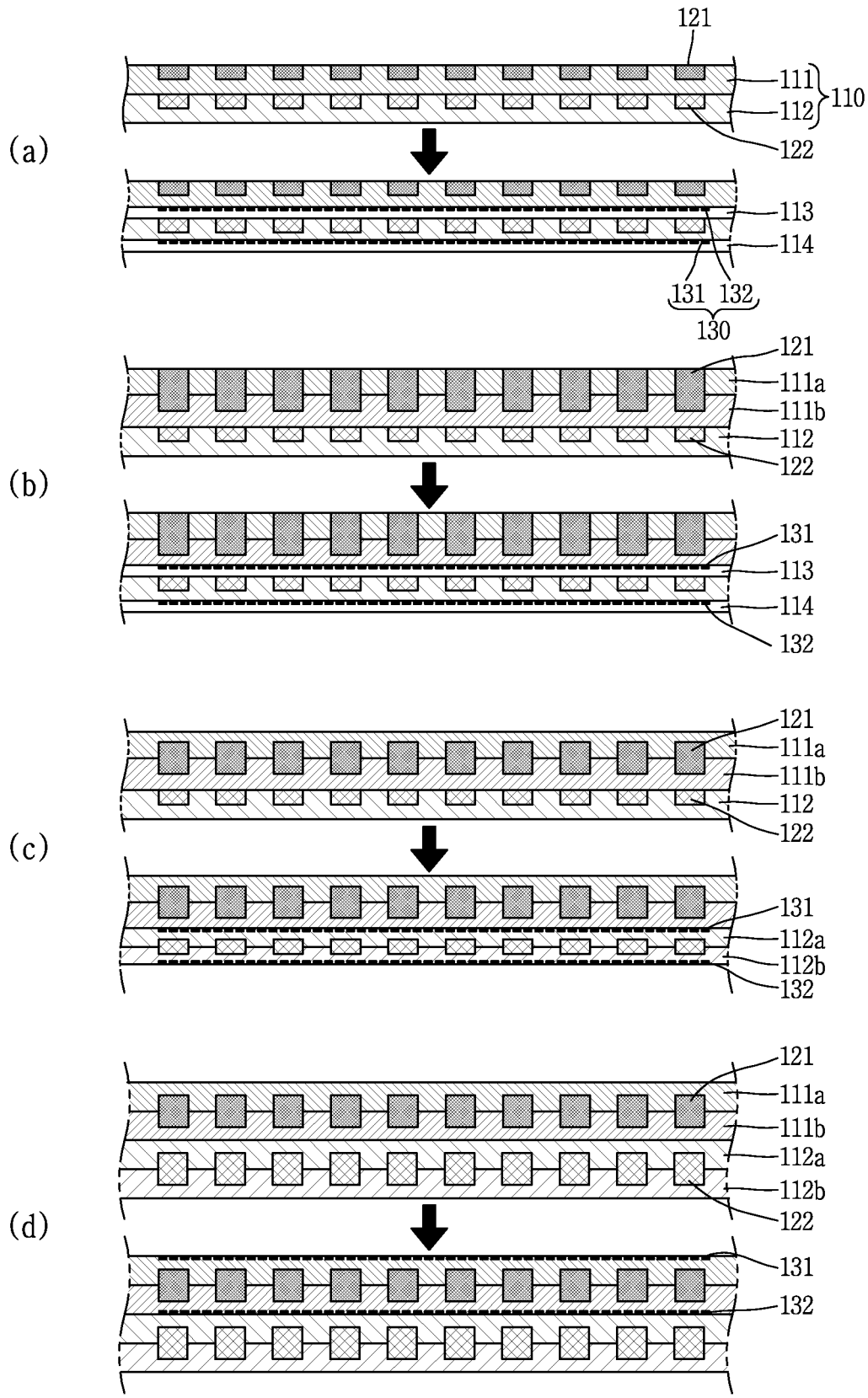
FIG. 1 is a conceptual view illustrating a flow path and a plate of a related art heat exchanger and first and second flow paths, a monitoring flow path, and a plate unit of a heat exchanger related to an embodiment of the present disclosure.

FIG. 1 is a conceptual view illustrating flow paths 121 and 122 and plate of the related art heat exchanger and first and second flow paths and monitoring flow paths 130 and a plate unit 110 of a heat exchanger related to an embodiment of the present disclosure.

The plate unit 110 refers to a unit block in which the same pattern is repeated to form a heat exchanger, and a main heat transfer part of the heat exchanger is configured by continuously stacking the plate unit 110.

(a) to (d) show different embodiments, and in each of the embodiments, an upper figure illustrates the related art embodiment without the monitoring flow path 130 and a lower figure illustrates the embodiment of the present disclosure having the monitoring flow path 130.

The heat exchanger according to an embodiment of the present disclosure includes a plate unit 110, flow paths 121 and 122, and a monitoring flow path 130. A flow path unit 121 and 122 may be used as a concept including the first flow path 121 and the second flow path 122.

The plate unit 110 may be formed by stacking a plurality of plates. In a plate, the flow paths 121 and 122 and the monitoring flow path 130 may be formed. The flow paths 121 and 122 or the monitoring flow path 130 may be formed by etching the plate, but one or more of etching, extruding, cutting, laser, and printing may be used or two or more methods of the processing methods may be used together. Since the plate includes the flow paths 121 and 122 in which a fluid flows, the plate may be manufactured such that a fluid does not leaked out through the plate from the flow paths 121 and 122 when the plate is in contact with a different member, that is, when the flow paths 121 and 122 are formed. Also, since the flow paths 121 and 122 in which a high temperature fluid flows and the flow paths 121 and 122 in which a low temperature fluid flows may be heat-exchanged through the plate, at least a portion of the plate may be formed of a material having high heat conductivity.

The flow paths are formed by processing at least a portion of each plate. A space in which a fluid flows may be formed within the flow paths 121 and 122. The flow paths 121 and 122 include a first flow path 121 in which a high temperature fluid flows and a second flow path 122 in which a relatively low temperature fluid flows. The first flow path 121 and the second flow path 122 may be formed to be spaced apart from each other and may be formed in different plates. The fluid flowing in the first flow path and the fluid flowing in the second flow path may be heat-exchanged. Or, one or more third flow paths (not shown) in which a high temperature or a low temperature fluid flows for a special purpose may also be additionally provided (i.e., three or more types of fluids).

Also, each of the flow paths 121 and 122 may have a flow path structure in which two or more plates overlap in order to increase an area of the flow paths 121 and 122 to reduce flow resistance. Also, each of the flow paths 121 and 122 may be open type flow paths 121 and 122 in order to reduce resistance of the flow paths 121 and 122 (please refer to FIG. 7).

The monitoring flow path 130 may be formed to be spaced apart from the flow paths 121 and 122. Also, when the plate is damaged and a fluid flows out from the inside of the flow paths 121 and 122, the leaked fluid may flow into the monitoring flow path 130. The monitoring flow path 130 may be formed between the first flow path 121 and the second flow path such that the fluid flowing out from the first flow path 1221 and/or the second flow path 122 easily flows to the monitoring flow path 130. Also, the monitoring flow path 130 may also be installed between the first plate 111 and the second plate 112 where the first flow path 121 and the second flow path 122 are not present. Also, in the drawing, it is illustrated that the first flow path 121 and the second flow path 122 are uniformly installed at the same interval, but the first flow path 121 and the second flow path 122 may be installed at different intervals or have a different shape.

In the monitoring flow path 130, a second monitoring flow path 132 may be formed in an outer side of the first flow path 121 or the second flow path 122, in addition to a first monitoring flow path 131 formed between the first flow path 121 and the second flow path 122. Also, since the heat exchanger is configured by continuously stacking the plate unit 110, the first monitoring flow path 131 and the second monitoring flow path 132 play the same role.

The monitoring flow path 130 may be formed in a plate separately provided to form the monitoring flow path 130 (please refer to (a) and (b)), or may be directly formed to be spaced apart from the first flow path 121 or the second flow path 122 in a plate where the first flow path 121 or the second flow path 122 is formed (please refer to (c) and (d)). Also, as described hereinafter, a fluid flowing within the monitoring flow path 130 is not particularly limited, and when a compressible fluid flows, a pressure controller 12 for detecting a change in volume of the compressible fluid according to a change in a temperature within the monitoring flow path 130 (please refer to FIG. 11B). Also, in the case of a incompressible fluid, the pressure controller 12 may be additionally provided to detect a change in pressure. Referring to (a), as illustrated in the upper drawing, in the related art, the first flow path 121 and the second flow path 122 are formed in the first plate 111 and the second plate 112, respectively. Also, as illustrated in the lower drawing, according to an embodiment of the present disclosure, the first monitoring flow path 131 and the second monitoring flow path 132 may be formed in the third plate 113 and the fourth plate 114, respectively. Also, here, the first and second plates may be applied as thinner plates.

Referring to (b), as illustrated in the upper drawing, the first flow path 121 is formed to across two first plates 111a and 111 b, and the second flow path 122 is formed in one second plate 112. Referring to the lower drawing, the third plate 113 is inserted between the first plate 111 and the second plate 112, and the fourth plate 114 is stacked below the second plate 112. Also, first and second monitoring flow paths 131 and 132 are formed in the third and fourth plates 113 and 114, respectively. Also, as the first and second plates 111a, 111b, and 112, plates thinner than those of the related art may be applied in order to reduce a size of the heat exchanger. Also, as described above, since the plate unit 110 is continuously stacked to form the heat exchanger, the first monitoring flow path 131 and the second monitoring flow path 132 play the same role.

Referring to (c), in the upper drawing (related art), the first flow path 121 is formed to across two first plates 111a and 111b and the second flow path 122 is formed in one second plate 112. In the lower drawing (embodiment of the present disclosure), the second channel 122 is also formed to across two plates 112a and 112b. Among the monitoring flow paths 130, the first monitoring flow path 131 may be formed in the lower plate 111b of the first plate 111 and the upper plate 112a of the second plate 112 so as to be in contact with the lower plate 111b of the first plate 111 and the upper plate 112a of the second plate 112. Also, the second monitoring flow path 132 may be formed in the lower plate 112b of the second plate 112. Here, the monitoring flow path 130 may be spaced apart from the first flow path 121 and the second flow path 122. Also, as the first plates 111a and 111b and the second plates 112a and 112b, thinner plates may be applied to reduce a size of the heat exchanger.

Referring to (d), in the upper drawing (related art), the first flow path 121 is formed to across two first plates 111a and 111b and the second flow path 122 is formed in two plates 112a and 112b. Also, in the lower drawing (an embodiment of the present disclosure), the first and second monitoring flow paths 131 and 132 are formed in the upper plate 111a of the first plate 111 and the upper plate 112a of the second plate 112. However, unlike the case illustrated in the drawing, the monitoring flow path 130 may also be formed in the lower plate 111b of the first plate 111 and the lower plate 112b of the second plate 112.

Also, unlike the case illustrated in the drawing, the first and second monitoring flow paths 131 and 132 are spaced apart from each other, but the first and second monitoring flow paths 131 and 132 may be sequentially formed between the first flow path 121 and the second flow path 122. That is, the first monitoring flow path 131 may be formed between the first flow path 121 and the second flow path 122 and the second monitoring flow path 132 may be formed between the first monitoring flow path 131 and the second flow path 122.

Figure 2A:
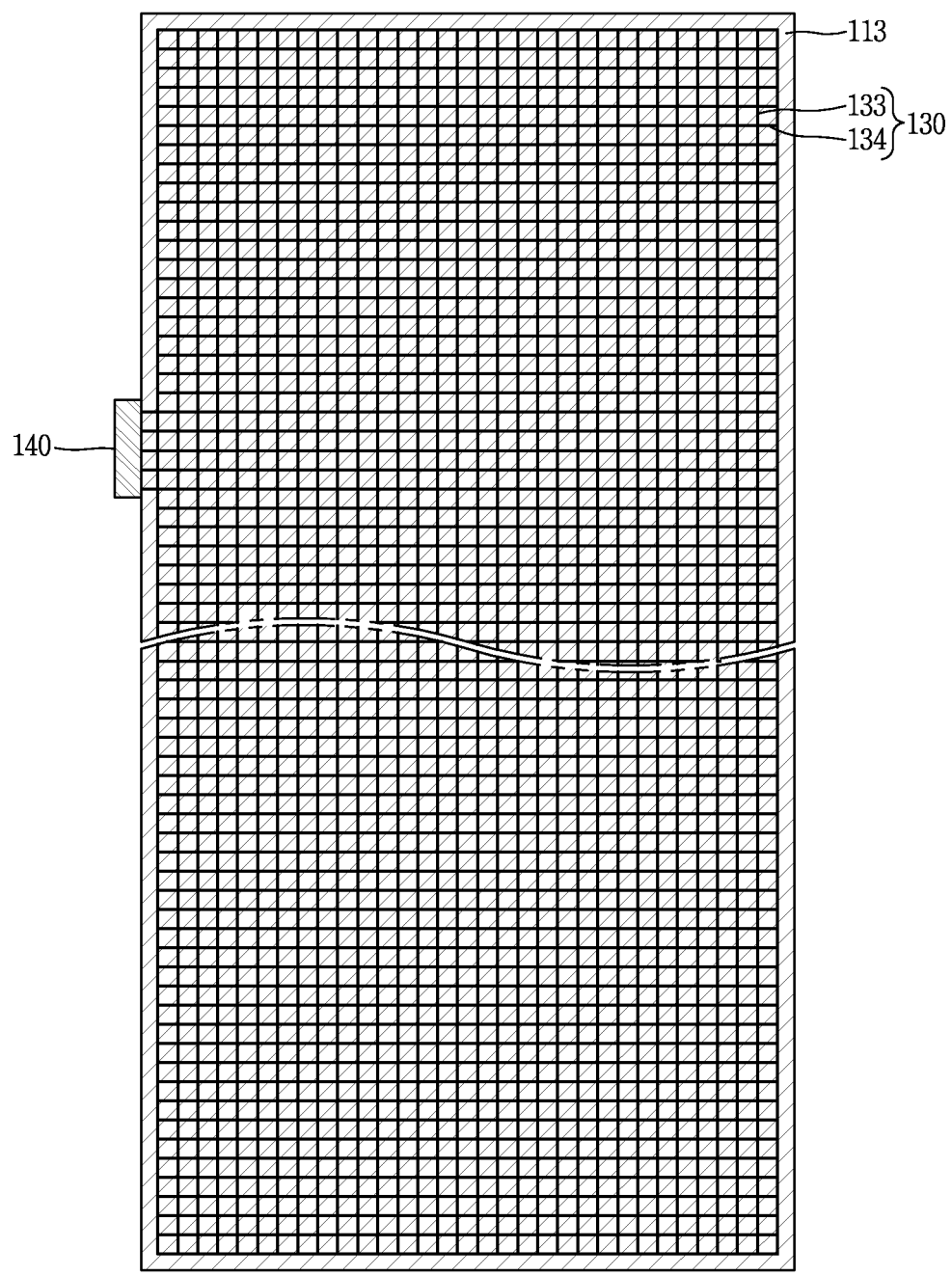
FIGS. 2A to 2C are conceptual views illustrating a monitoring flow path, a plate forming a monitoring flow path, and a header of a monitoring flow path.
Figure 2B:
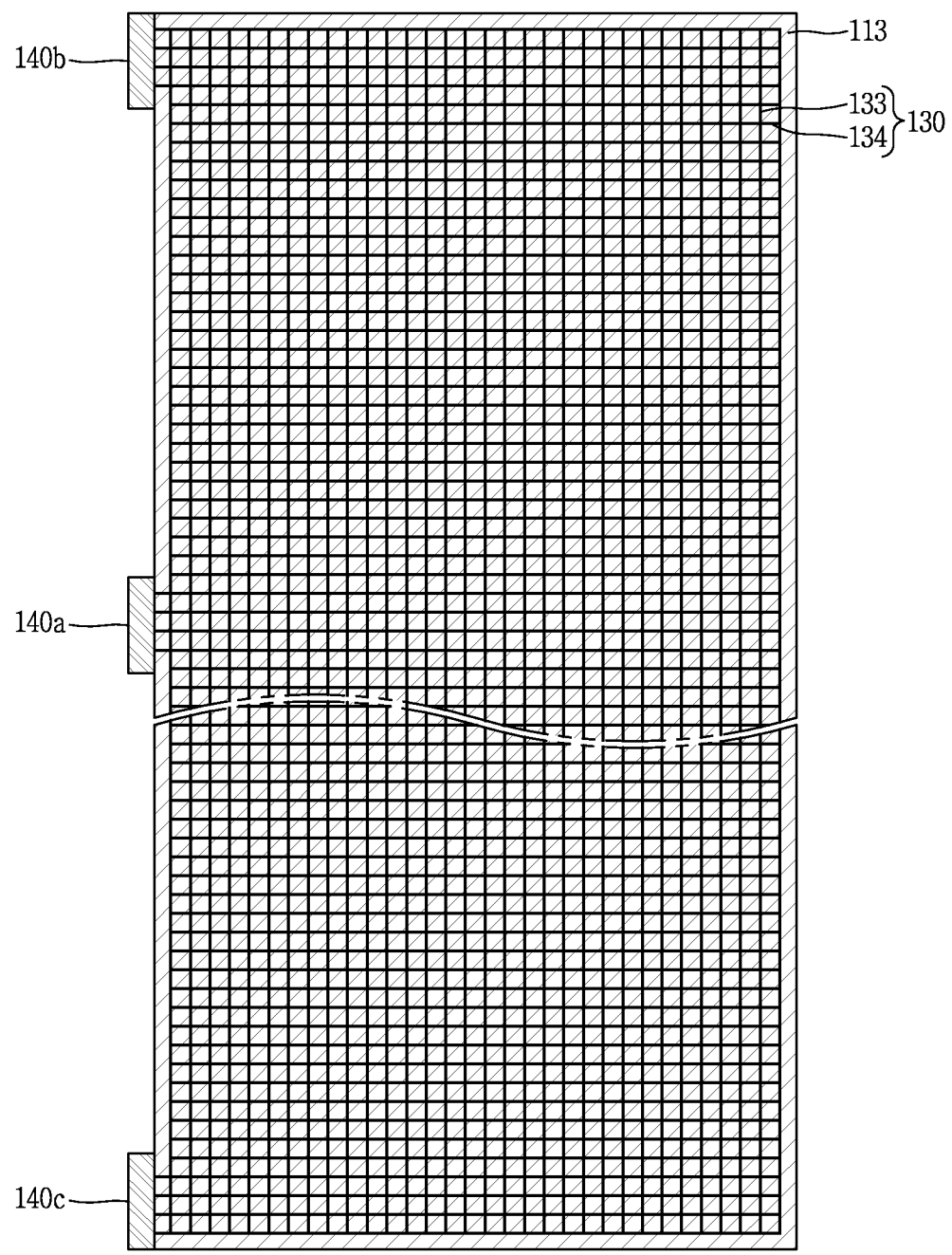
Figure 2C:
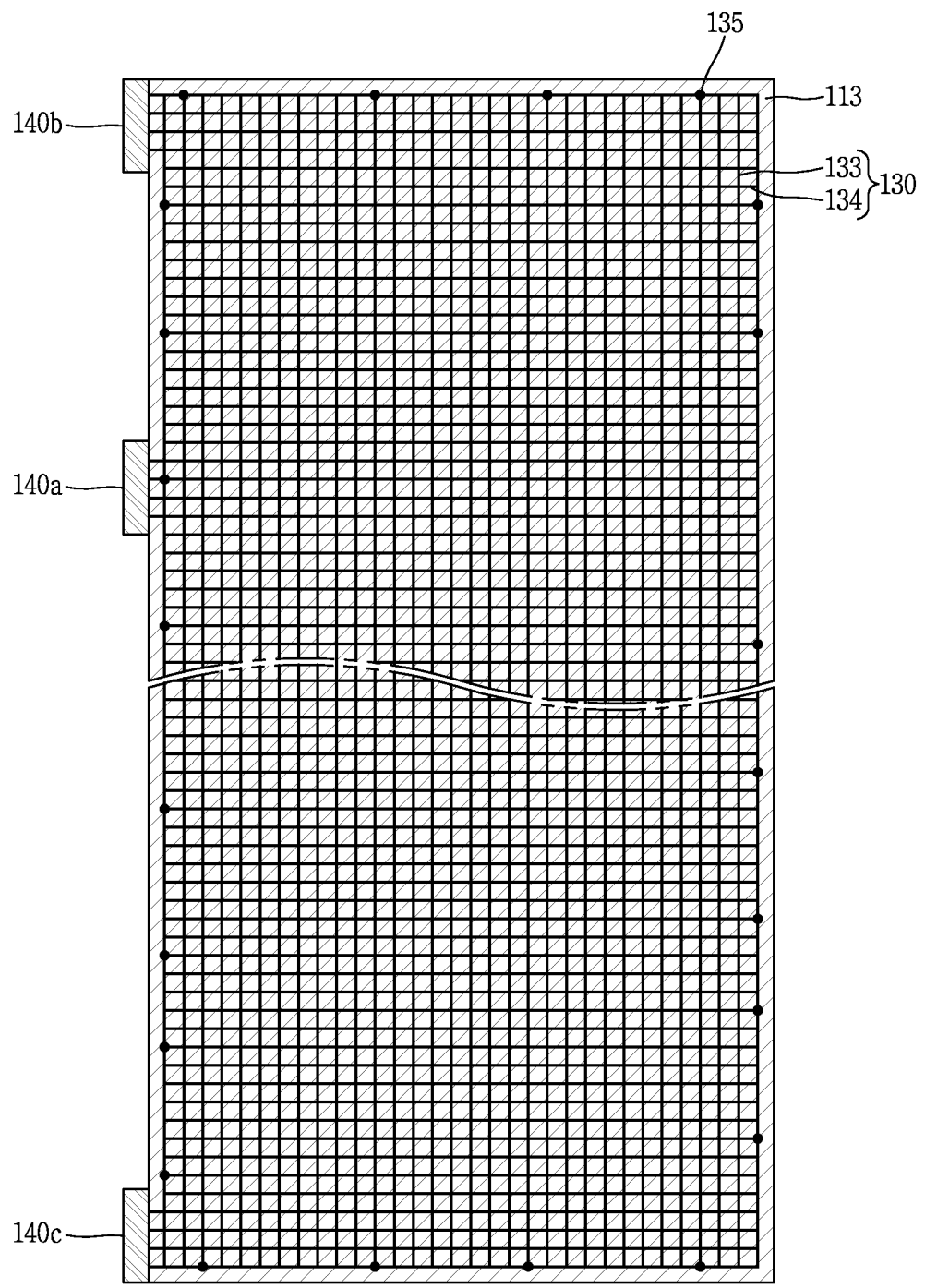

FIGS. 2A to 2C are conceptual views illustrating a monitoring flow path 130, a plate forming the monitoring flow path 130, and a header of the monitoring flow path 130.

Referring to FIG. 2A, it is illustrated that the monitoring flow path 130 (the first monitoring flow path 131 or the second monitoring flow path 132) is formed on the opposite side of the first flow path 121 or the second flow path 122 of the first plate 111 of the second plate 112 or in the third plate 113. As the monitoring flow path 130, a fine flow path may be applied in order to prevent a reduction in heat exchange performance between the first flow path 121 and the second flow path 122 and minimize a structural affect on the heat exchanger. A size of a cross-section of the fine flow path may be smaller than that of the first or second flow path 121 or 122.

Also, the monitoring flow path 130 may include first passages 133 formed in one direction as the plurality of flow paths 121 and 122 are spaced apart from each other, and second passages 134 allowing the first passages 133 to communicate with each other. In this manner, when the first passage 133 and the second passage 134 communicate with each other, open flow paths 133 and 134 are formed, and when a leakage occurs in a portion of the open flow paths 133 and 134 (that is, when a plate is damaged so a fluid is leaked from the first flow path 121 or the second flow path 122 to flow to the monitoring flow path 130), the first passage 133 and the second passage 134 communicate with each other. The fluid or an influence thereof propagates along the open flow paths 133 and 134 so as to be collected by a header 140 (to be described hereinafter), facilitating measurement.

The monitoring flow path header 140 may be configured such that the plurality of flow paths 133 and 134 forming the monitoring flow path 130 gather to detect a change in a state of a fluid within the monitoring flow path 130. The monitoring flow path header 140 may be installed toward an outside of the fine flow path and serve to transmit a state of the monitoring flow path 130 within the heat exchanger to the outside of the heat exchanger.

Referring to FIG. 2B, contaminant removing headers 140b and 140c may be added to remove a contaminant from the flow paths 121 and 122 within the monitoring flow path 130. The contaminant removing headers 140b and 140c may include a header 140b for injecting chemicals for removing a contaminant and a header 140c for extracting chemicals for removing a contaminant. That is, a total of two headers may be provided. The contaminant removing headers 140b and 140c may be disposed in upper and lower portions of the monitoring flow path header 140, respectively. However, according to a method for monitoring a state, only the contaminant removing headers 140b and 140c may be installed and a connection pipe connecting the contaminant removing headers 140b and 140c to the outside may be provided to allow a small amount of fluid to continuously flow from the outside and be collected at the outside (not shown).

Descriptions of a structure which is the same as or similar to that of FIG. 2A will be omitted.

Referring to FIG. 2C, the monitoring flow path 130 may further include third passages 135 formed in a direction different from those of the first passages 133 and the second passages 134. The third passages 135 may be formed in a direction perpendicular to the ground (i.e., in a vertical direction) with respect to the drawing. Referring to FIG. 1, since the third plate 113 is formed between the first plate 111 and the second plate 112, the third passages 135 may connect the first and second plates 112 to the third plate 113. When the plates are diffusion-bonded, a gap may be formed between the plates, and here, in order to detect a fluid flowing out though the gap, the third passages 135 connecting a portion of the first and second plates 112 in which the first flow path 121 and the second flow path 122 are not installed to the monitoring flow path 130 of the third plate 113 are formed.

However, unlike the cases illustrated in FIGS. 2A to 2C, the monitoring flow path 130 may be directly formed in the first plate 111 or the second plate 112 (please refer to FIG. 1), the third plate 113 FIGS. 2A to 2D may be the first plate 111 or the second plate 112.

Figure 2D:
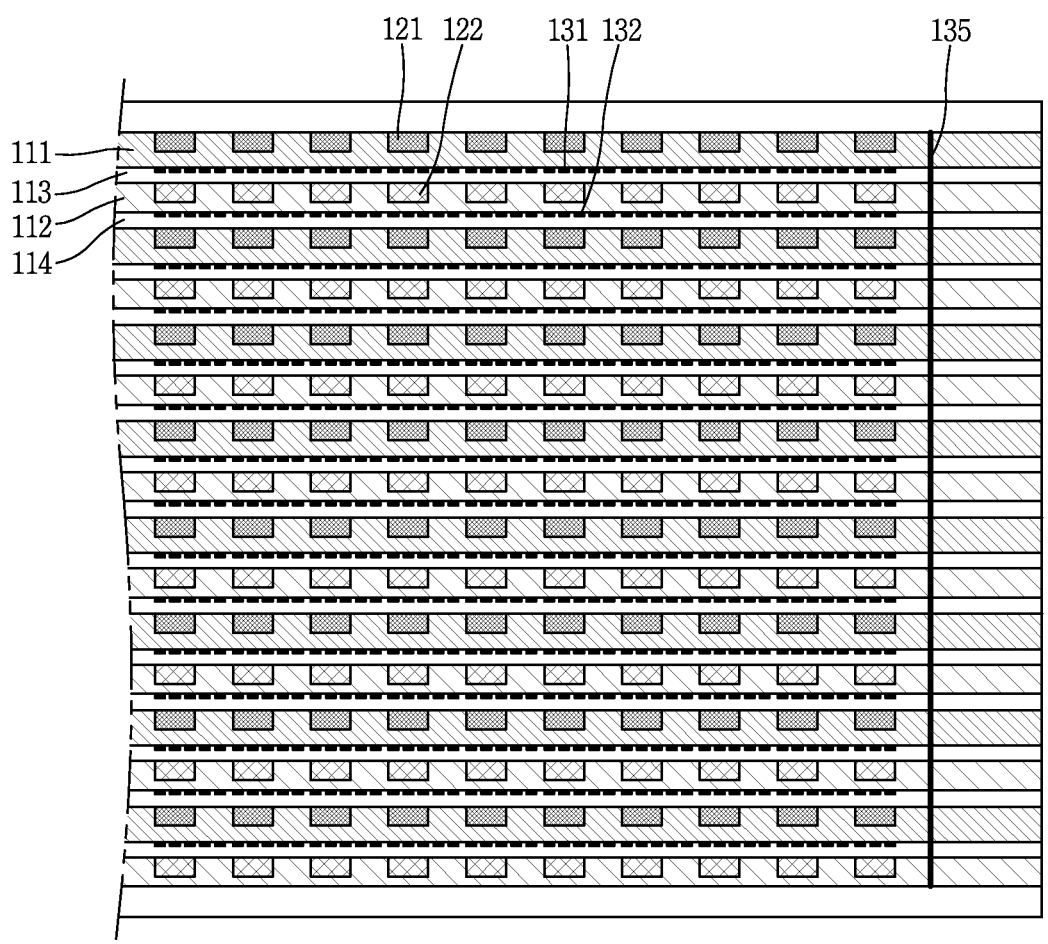
FIG. 2D is a conceptual view illustrating first and second flow paths, a monitoring flow path, and a plate unit in a different direction.

FIG. 2D is a conceptual view illustrating the first and second flow paths 121 and 122, the monitoring flow path 130, and the plate unit 110 in a different direction.

Referring to FIG. 2D, the first plate 111, the third plate 113, the second plate 112, and the fourth plate 114 are repeated. Also, the first flow path 121, the first monitoring flow path 131, the second flow path 122, and the second monitoring flow path 132 are formed in each of the plates.

Also, as discussed above with reference to FIG. 2C, a third passage 135 may be formed to penetrate through each of the plates.

FIGS. 3 to 6 are conceptual views illustrating a configuration in which a first or second flow path 121 or 122 having a closed flow path structure is formed in a plate unit.

In this embodiment, the first flow path 121 and the second flow path 122 may follow a configuration of a general heat exchanger or steam generator. Also, FIGS. 3 to 6 are illustrated with respect to the first plate 111 in which the first flow path 121 is formed, but unlike these drawings, the second plate 112 in which the second flow path 122 is formed may have the same or similar shape. Hereinafter, descriptions will be made on the basis of the first flow path 121.

Figure 3:
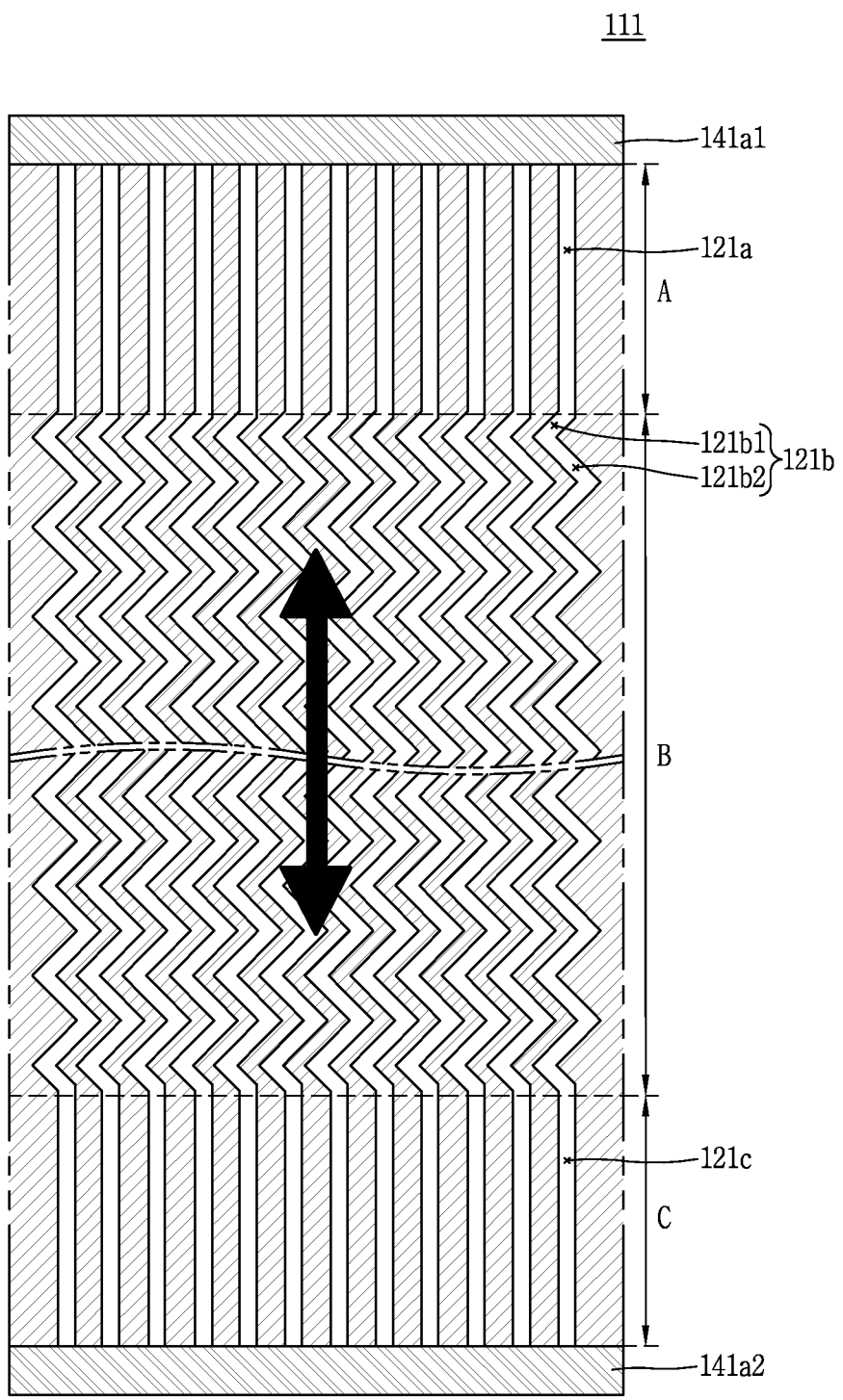
FIGS. 3 to 6 are conceptual views illustrating a configuration in which a first or second flow path having a closed type flow path structure is formed in a plate unit.

Referring to FIG. 3, a general plate type flow path may be formed and have a closed flow path structure (a structure in which adjacent flow paths do not communicate with each other). Also, headers 141a1 and 141a2 in which flow paths gather may be provided in upper and lower portions.

The first flow path 121 may include an inlet/outlet region A connected to one 141a1 of the headers, the main heat transfer part B, and inlet/outlet region C connected to the other 141a2 of the headers. Among them, the main heat transfer part 121b may be repeatedly bent in an oblique line in an advancing direction of the flow path. That is, a first bent flow path 121b1 bent at about 45 degrees from the inlet/outlet region flow path 121a in one direction and a second bent flow path 121b2 bent from the first bent flow path 121b1 in a direction perpendicular to about 90 degrees may be repeatedly formed. This is a method generally used to increase a heat transfer area to allow the main heat transfer part B to heat-exchange with the second flow path 122 (please refer to FIG. 2D). However, the flow paths may have various other shapes without being limited thereto.

Figure 4:
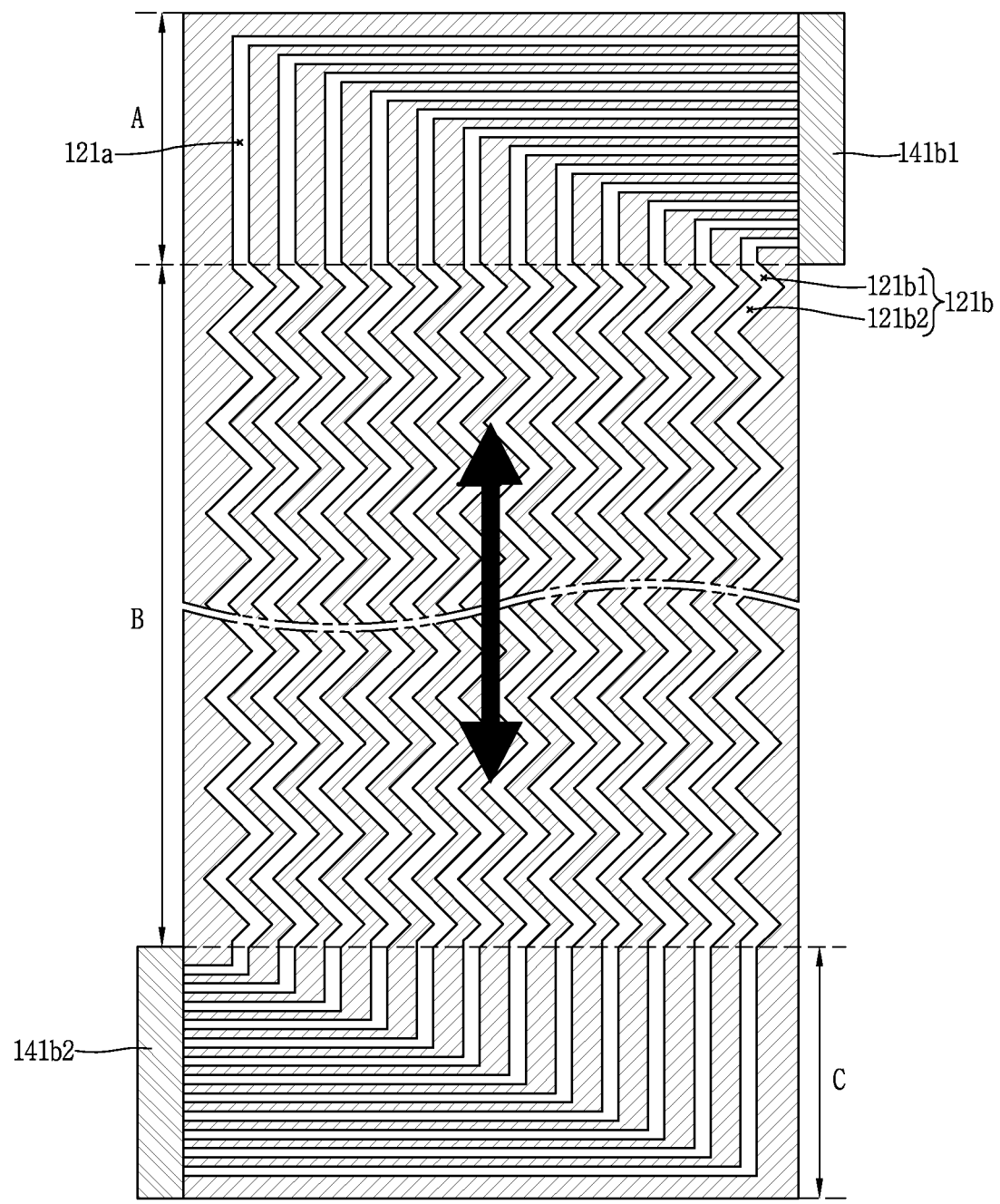

Referring to FIG. 4, two headers 141b1 and 141b2 may be formed on an upper portion of one side of the first plate 111 and a lower portion of the other side of the first plate 111 to face in mutually opposite directions.

Figure 5:
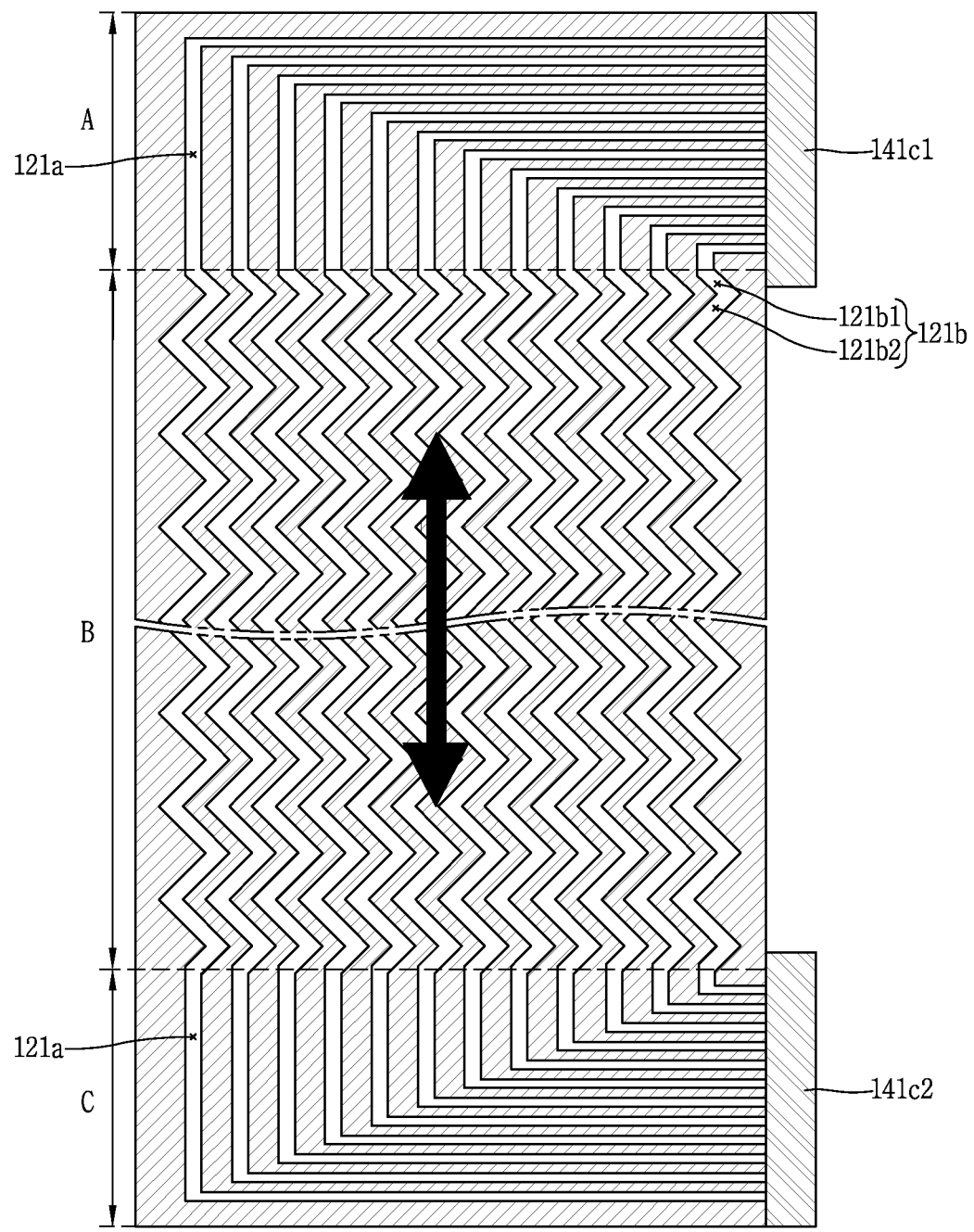

Referring to FIG. 5, two headers 141c1 and 141c2 may be formed in upper and lower portions of one side of the first plate 111 to face in the same direction.

Figure 6:
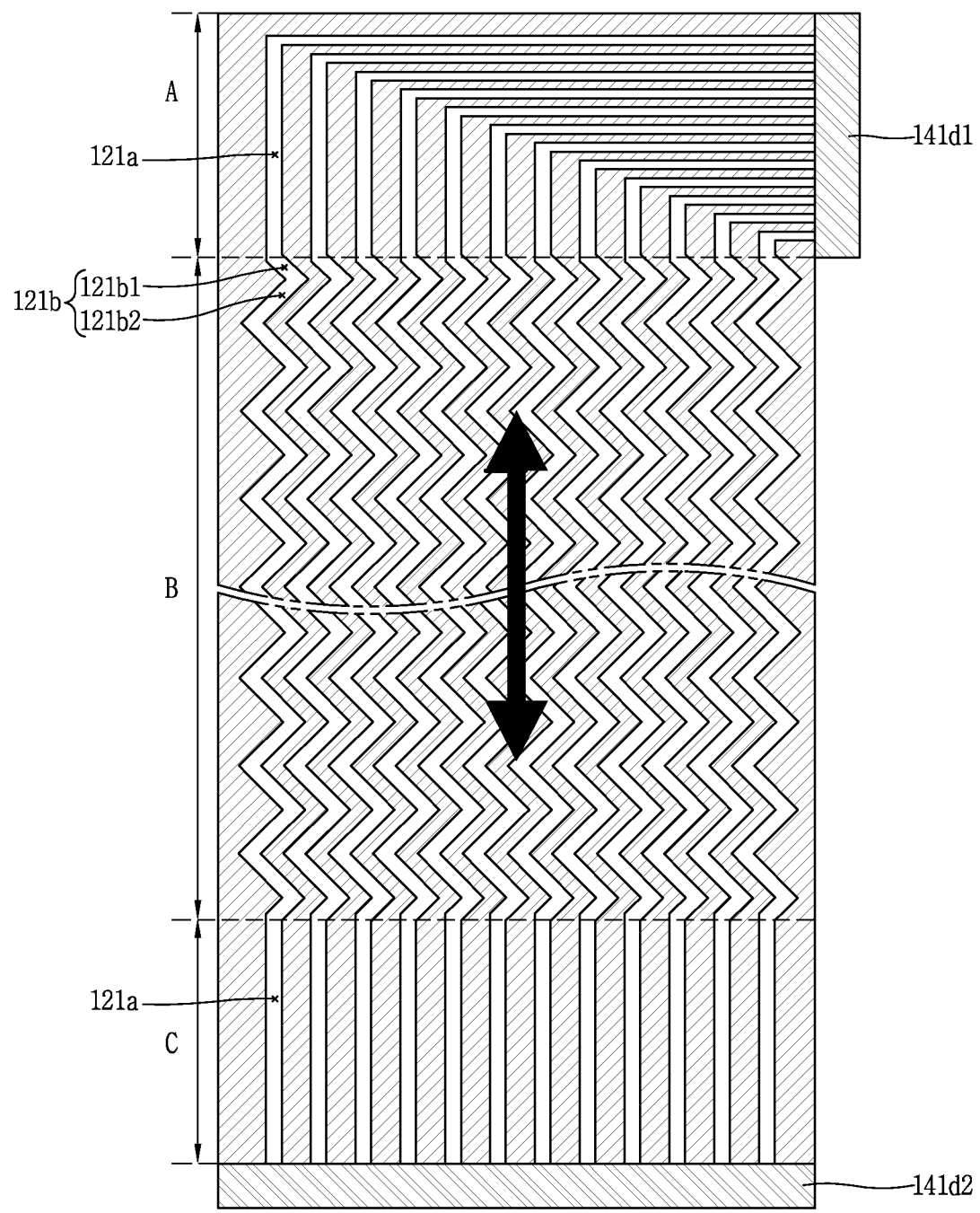

Referring to FIG. 6, one 141d2 of the two headers 141d1 and 141d2 may be formed in a lower portion of the first plate 111 and the other 141d1 may be formed on one side of the first plate 111. The header 141d1 formed on one side is formed to be adjacent to the other end portion of one end portion where the header 141d2 is formed such that the header 141d1 is formed on the opposite side of another header 141d2. In this manner, the headers may be configured in various manners.

FIGS. 7 to 10 are conceptual views illustrating a configuration in which the second flow paths 221, 321, 421, and 421 are formed in a plate unit.

The second flow paths 221, 321, 421, and 521 may be a portion of the steam generator to which a fluid is supplied from a feedwater system and discharged to a turbine system. In this case, in order to resolve flow instability of the inlets of the second flow paths 221, 321, 421, and 421, flow resistance parts 321e, 421e, and 521e may be installed at the inlets of the second flow paths 221, 321, 421, and 521 in order to increase resistance of flow paths (please refer to FIGS. 8 to 10). Also, a common header 521f may be added to the inlets of the flow resistance parts 321e, 421e, and 521e.

Figure 7:
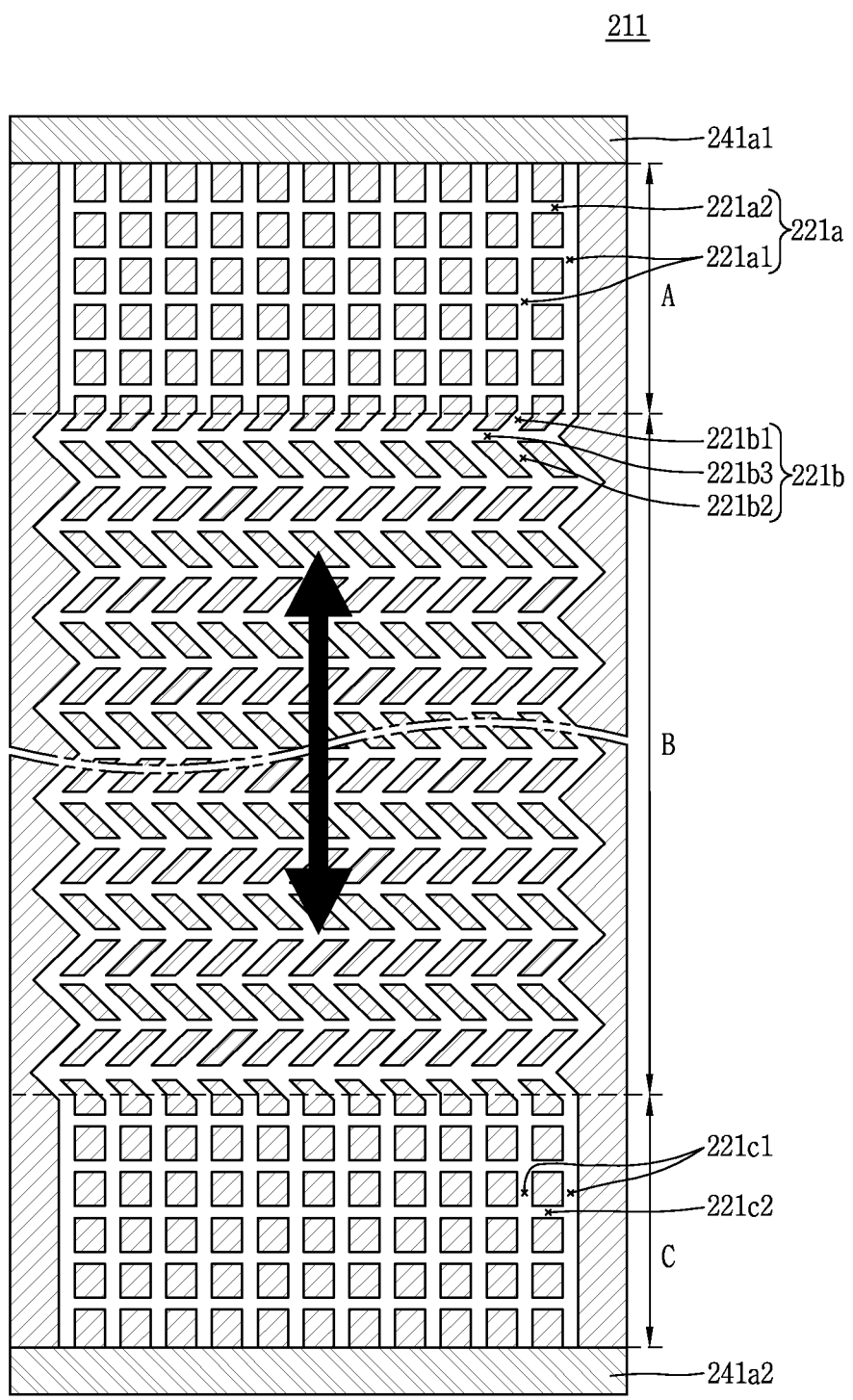
FIGS. 7 to 10 are conceptual views illustrating a configuration in which a second flow path is formed in a plate unit.

Referring to FIG. 7, the second flow paths 221, 321, 421, and 521 may include a plurality of main flow paths 221a1, 221b1, 221b2, and 221c1 spaced apart from each other and sub-flow paths 221a2, 221b2, and 221c2 formed such that the main flow paths 221a1, 221b1, 221b2, and 221c1 spaced apart from each other communicate with each other. The second flow path 221 may have an open structure though the main flow paths and the sub-flow paths.

The open structure is a structure having a function of reducing resistance of a flow path or alleviating rapid variation in pressure made in a specific portion in the case of two phase flow. In order to further reduce flow resistance, a streamlined structure may also be applied in addition to the open structure.

Also, in the inlet/output region A, a main flow path 221a1 through which a fluid flows from one header 241a1 to the opposite header and a sub-flow path 221a2 allowing the main flow paths 221a1 to communicate with each other are formed. Such an open structure may also be applied to the main heat transfer part B and the opposite inlet/output region C as illustrated.

Figure 8:
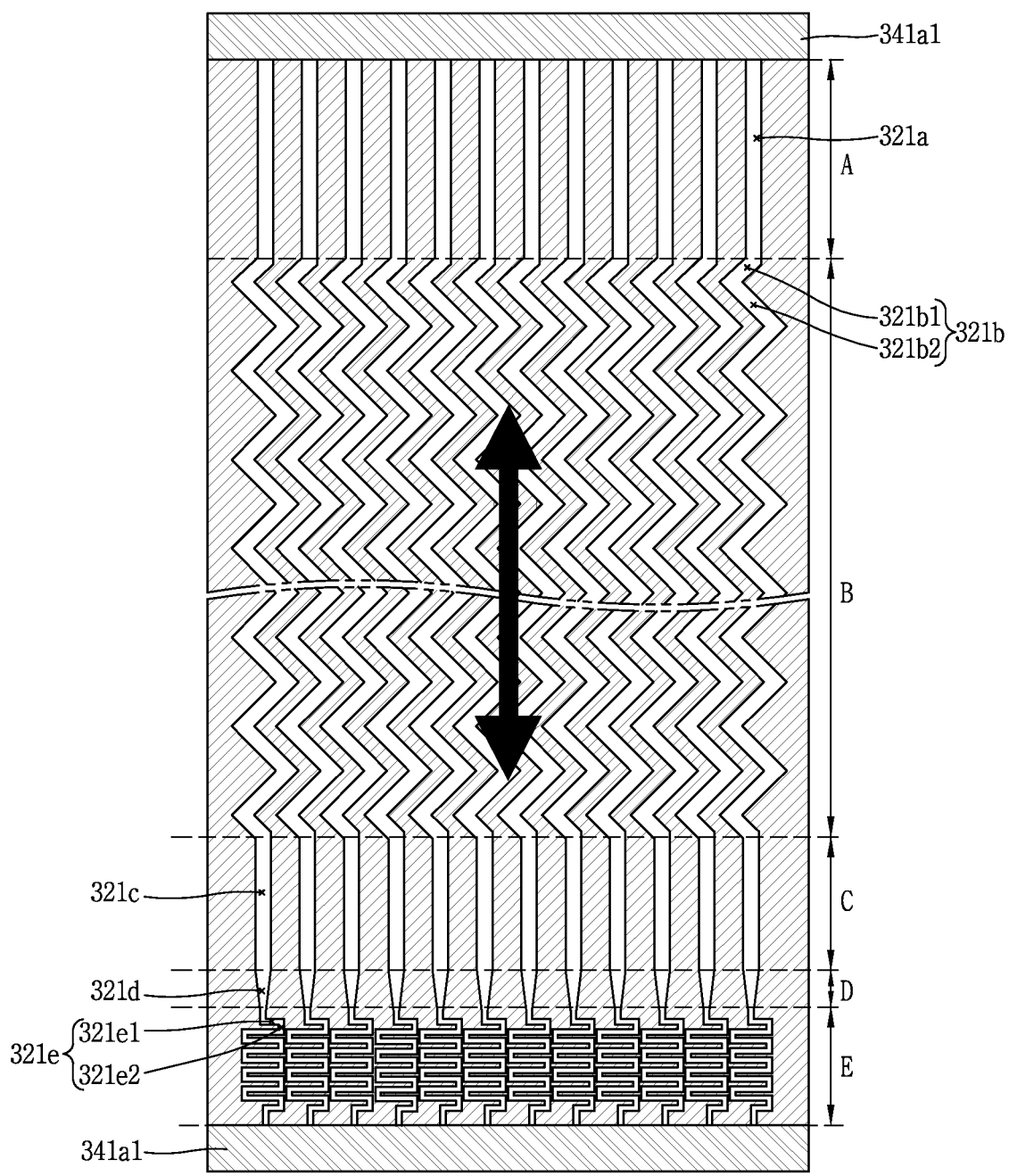

Referring to FIG. 8, in order to increase resistance of a flow path to resolve flow instability the second flow path 321 may due to a change in a phase of a fluid in an inlet portion through which a fluid is introduced, the flow second flow path 321 may include a flow resistance part 321e including a bent or curved flow path lengthened to be greater than a length formed by linearly connecting the inlet and the outlet.

The flow resistance part 321e may be formed as an economizer in which bent shapes are repeated in a progress direction of the flow path in order to make a flow rate of a fluid introduced to the flow path uniform and enhance heat transfer.

The inlet flow resistance part 321e serves to reduce instability of an abnormal flow appearing as steam is generated by the steam generator and is installed to reduce propagation of rapid variation in pressure made in the upper side to a lower side.

In the present disclosure, it is illustrated that the flow resistance parts 321e, 421e, and 521e are bent, but a similar effect may also be obtained when a curved flow path is used. That is, the present disclosure is not limited to the bent shape.

Figure 9:
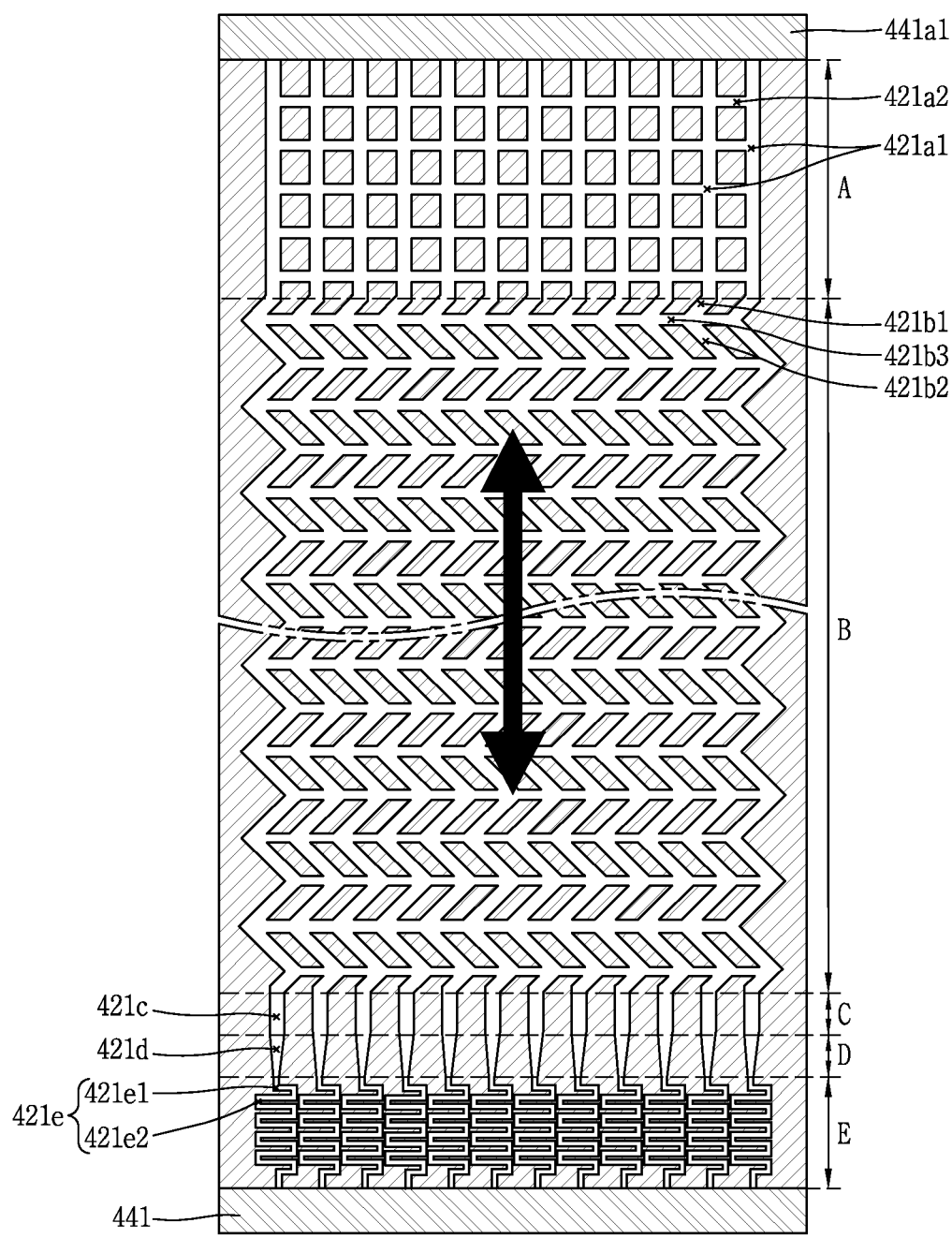

Referring to FIG. 9, the second flow path 421 has an open structure (please refer to FIG. 7) and the flow resistance part 421e or an economizer is formed at the inlet side.

The economizer may stabilize flow in the inlet region when a shell side (outside of the tube) in the shell & tube type steam generator is utilized as a secondary fluid (feedwater/steam). Also, the economizer is installed to increase efficiency of heat transfer. In the case of the open structure, the flow resistance part 421e may play a role similar to that of the economizer on the shell side in the shell & tube type steam generator.

In this embodiment, water may be fed to a header 441 position on a lower side of the drawing. That is, the lower header 441 side is an inlet. Also, the flow resistance part (or economizer) 421e (E region) is formed on the upper side, and a flow path enlarging part D in which a flow path is enlarged, an inlet region C, a main heat transfer part B, and an outlet region A are sequentially formed.

Figure 10:
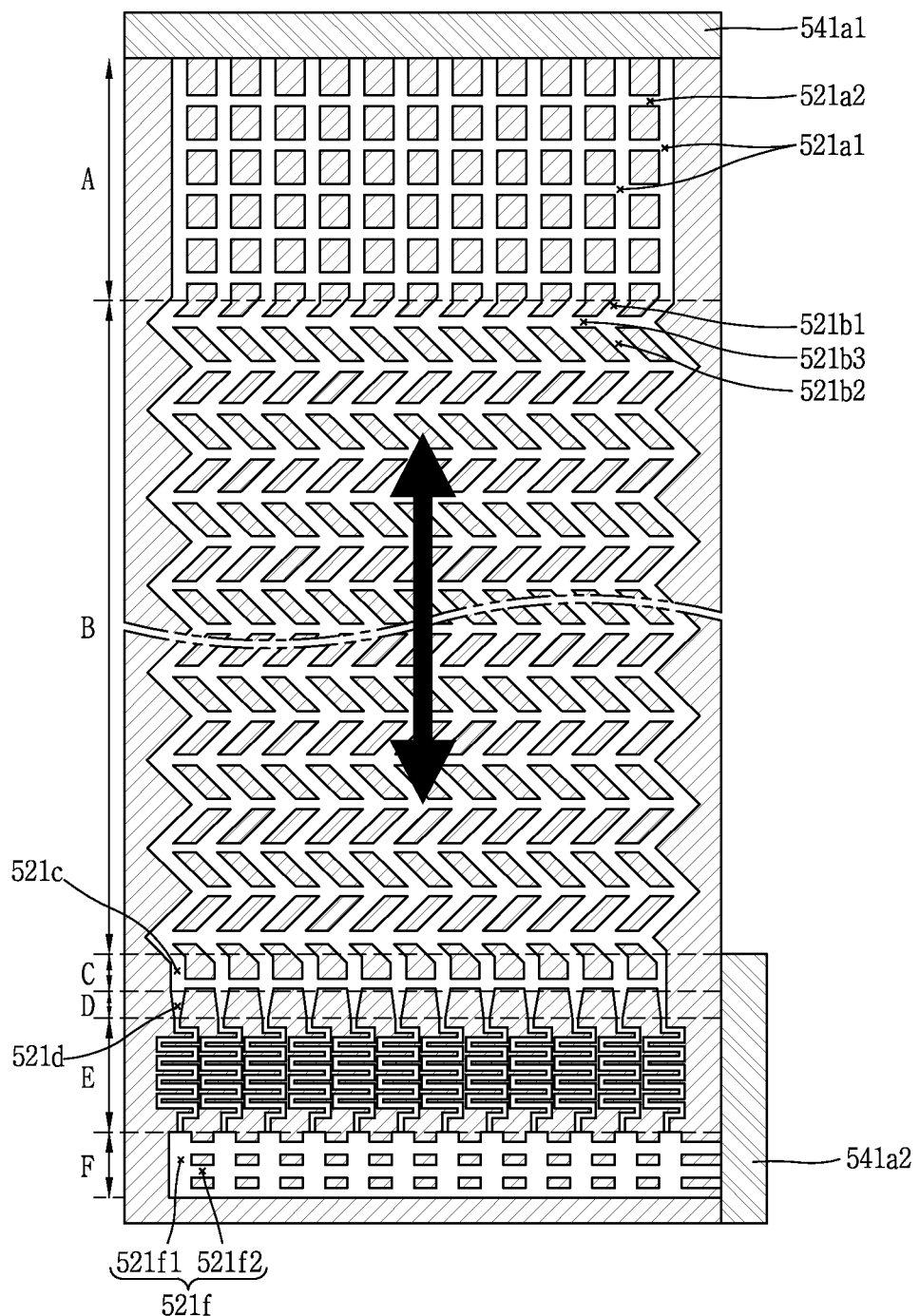

Referring to FIG. 10, the second flow path 521 has an open structure, and headers 521a1 and 521a2 are installed in upper and lower sides. An inlet common header 521f is installed in the header 521a2 installed on the lower side.

The inlet common header 521f may be installed in order to connect an inlet of a flow path and a flow resistance part 521e E and distribute a flow path to the flow resistance part 521e (economize).

Descriptions of the contents similar to or same as those of the aforementioned embodiment will be omitted.

Figure 11A:
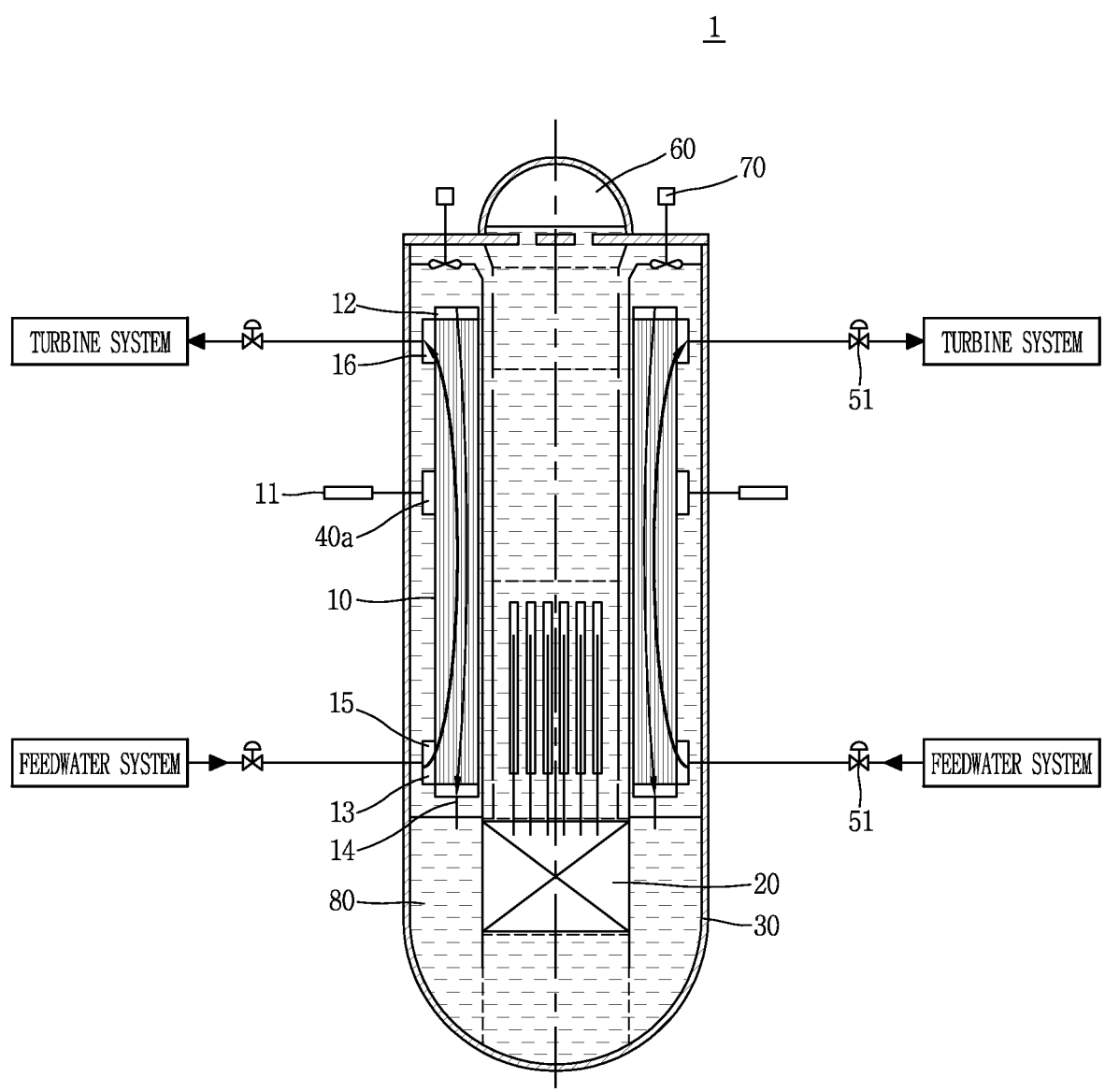
FIGS. 11A and 11B are conceptual views illustrating a nuclear power plant accommodating a heat exchanger according to different embodiments of the present disclosure.
Figure 11B:
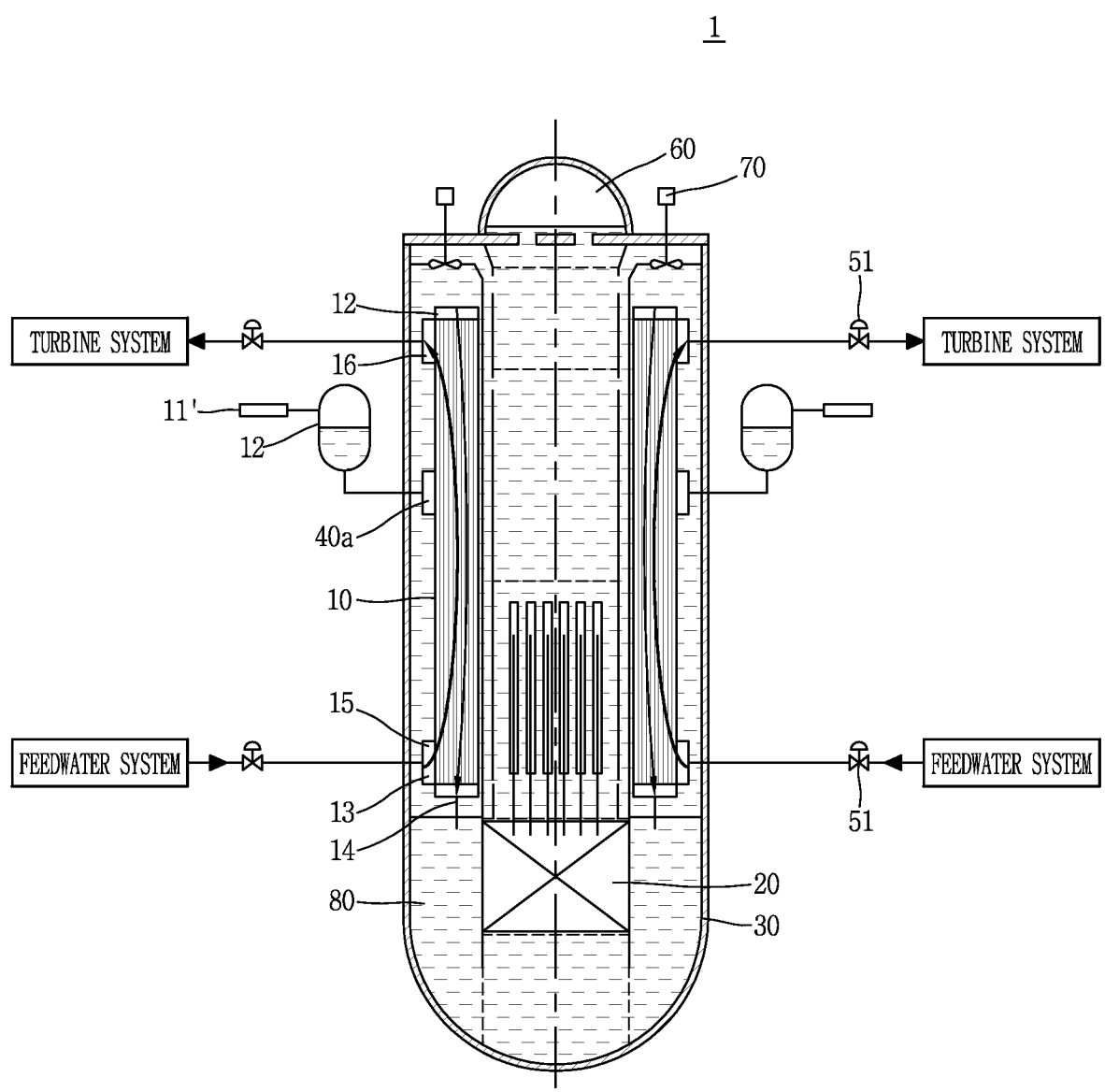

FIGS. 11A and 11B are conceptual views illustrating a nuclear power plant 1 accommodating a heat exchanger 10 according to another embodiment of the present disclosure.

The nuclear power plant 1 according to an embodiment of the present disclosure includes a nuclear reactor 30 and a heat exchanger 10. The nuclear reactor 30 includes a reactor core 20 and is formed such that a coolant 80 to circulate therein. Also, the heat exchanger 10 may be a heat exchanger 10 according to any one of the aforementioned embodiments. Also, the heat exchanger 10 may be a steam generator generating steam from feedwater upon receiving a high temperature high pressure coolant heated by the reactor core 20.

Also, in this embodiment, an internal pump (canned pump) 70 may be provided, and the steam generator 10 is disposed within the nuclear reactor 30.

Referring to FIG. 11A, a sensor unit 11 may be connected to a monitoring flow path header 40a. In this embodiment, a incompressible fluid may flow in a monitoring flow path. When a fluid flows out from the flow path and is introduced to the monitoring flow path, the sensor unit 11 may be configured to sense a change in temperature, pressure, humidity, a physical state, a chemical state, or a radioactive level within the monitoring flow path.

Also, when an abnormal state higher than a preset value set in the sensor unit 11 is detected, a facility related to the heat exchanger 10 or the steam generator is stopped to take measures before an accident occurs, thereby increasing safety of the nuclear power plant 1.

In FIG. 11B, a compressible fluid may flow in the monitoring flow path within the heat exchanger 10. Also, the monitoring flow path header 40a may further include a pressure controller 12 detecting a variation in pressure due to a change in volume of a fluid. Also, the pressure controller 12 may be further provided to accept a variation in pressure even in the case of a incompressible fluid.

In addition, a monitoring measurement instrument 11' for detecting a change in a state within the pressure controller 12 may be further provided and connected to the pressure controller 12.

described above are not limited to the configuration and method of the embodiments of the present disclosure described above and the entirety or a portion of the embodiments may be selectively combined to form various modifications.

INDUSTRIAL APPLICABILITY

The present disclosure may be used in a heat exchanger and a nuclear power plant industrial field.

The invention claimed is:

1. A heat exchanger comprising:
   a plate unit in which a plurality of plates overlap one another;
   a flow path unit forming a flow path in which a fluid flows by processing at least a portion of each plate; and
   a monitoring flow path formed between the plurality of plates such that a fluid leaked from the flow path flows thereto, and detecting a fluid leaked from the flow path,
   wherein the monitoring flow path is formed as a plurality of flow paths, and includes a monitoring flow path header to which the plurality of flow paths gather, in order to detect a change in a state of a fluid within the monitoring flow path, and
   wherein the inside of the monitoring flow path is filled with a compressible fluid or incompressible fluid, and
   a pressure controller detecting a change in pressure is connected to the monitoring flow path header.

2. The heat exchanger of claim 1, wherein
   the flow path unit includes:
   a first flow path in which a fluid having a relatively high temperature flows; and
   a second flow path spaced apart from the first flow path and allowing a fluid having a temperature lower than that of the high temperature fluid to heat-exchange with the high temperature fluid.

3. The heat exchanger of claim 2, wherein the monitoring flow path is formed between the first flow path and the second flow path.

4. The heat exchanger of claim 3, wherein
   the monitoring flow path includes a first monitoring flow path and a second monitoring flow path spaced apart from each other,
   the first monitoring flow path is formed between the first flow path and the second flow path, and
   the second monitoring flow path is formed between the first monitoring flow path and the second flow path.

5. The heat exchanger of claim 2, wherein the plate unit includes:
   a first plate in which the first flow path is formed; and
   a second plate in which the second flow path is formed, and
   the monitoring flow path is formed between the first and second plates.

6. The heat exchanger of claim 5, further comprising:
   a third plate disposed between the first and second plates,
   wherein the monitoring flow path is formed in the third plate.

7. The heat exchanger of claim 6, wherein the monitoring flow path is formed to be in contact with the first plate or the second plate.

8. The heat exchanger of claim 6, further comprising:
   a fourth plate spaced apart from the third plate and formed to be in contact with the first plate or the second plate,
   wherein the monitoring flow path is formed as a plurality of flow paths and includes a first monitoring flow path formed in the third plate and a second monitoring flow path formed in the fourth plate.

9. The heat exchanger of claim 1, wherein
   the monitoring flow path is formed as an open flow path including:
   first passages formed in one direction as a plurality of flow paths are spaced apart from each other; and
   a second passage allowing the first passages to communicate with each other.

10. The heat exchanger of claim 9, wherein
    the monitoring flow path further includes a third passage connected to at least one of the first passage and the second passage and formed to penetrate through the plate unit.

11. The heat exchanger of claim 2, wherein
    the monitoring flow path is formed as a fine flow path having a size of a cross-section smaller than those of the first flow path and the second flow path in order to restrain a degradation of performance of heat exchange between the first flow path and the second flow path.

12. The heat exchanger of claim 2, wherein
    at least one of the first and second flow paths is formed across at least two plates.

13. The heat exchanger of claim 1, further comprising:
a monitoring measurement instrument connected to the pressure controller and detecting a change in an internal state of the pressure controller.

14. The heat exchanger of claim 2, wherein
the flow path unit exchanges heat through at least one of the first flow path and the second flow path, and
further includes at least one of a third flow path in which a fluid having a high temperature or low temperature, relative to fluids flowing in the first flow path and the second flow path, flows.

15. The heat exchanger of claim 2, wherein
the second flow path includes a flow resistance part including a bent or curved flow path extending to be longer than a length of a straight line drawn from the inlet to the outlet, in order to increase resistance of a flow path to resolve flow instability due to an introduction of a fluid to an inlet portion through which a fluid is introduced.

16. The heat exchanger of claim 2, wherein
the second flow path includes:
a plurality of main flow paths spaced apart from each other; and
a sub-flow path formed such that the main flow paths spaced apart from each other communicate with each other.

17. The heat exchanger of claim 15, wherein
the flow resistance part is formed as an economizer in which a bent form is repeated in a progress direction of the flow path in order to make a flow rate of a fluid introduced to the flow path uniform and enhance heat transfer.

* * * * *